(12) United States Patent
Luo et al.

(10) Patent No.: US 9,282,063 B2
(45) Date of Patent: Mar. 8, 2016

(54) CELL PROCESSING METHOD AND DEVICE FOR SWITCH FABRIC CHIP

(75) Inventors: Songhui Luo, Shenzhen (CN); Huarui Liu, Shenzhen (CN)

(73) Assignee: ZTE MICROELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 137 days.

(21) Appl. No.: 14/233,094

(22) PCT Filed: Apr. 27, 2012

(86) PCT No.: PCT/CN2012/074866
§ 371 (c)(1),
(2), (4) Date: Jan. 15, 2014

(87) PCT Pub. No.: WO2013/010396
PCT Pub. Date: Jan. 24, 2013

(65) Prior Publication Data
US 2014/0177438 A1    Jun. 26, 2014

(30) Foreign Application Priority Data
Jul. 19, 2011   (CN) .......................... 2011 1 0202414

(51) Int. Cl.
*H04L 12/931*   (2013.01)
*H04L 12/935*   (2013.01)
(Continued)

(52) U.S. Cl.
CPC ............ *H04L 49/506* (2013.01); *H04L 45/745* (2013.01); *H04L 47/125* (2013.01);
(Continued)

(58) Field of Classification Search
None
See application file for complete search history.

(56) References Cited

U.S. PATENT DOCUMENTS

| 7,170,854 B1 * | 1/2007 | Orrell .................. H04L 49/208 370/218 |
| 2002/0080787 A1 * | 6/2002 | Kim et al. ..................... 370/390 |

(Continued)

FOREIGN PATENT DOCUMENTS

| CN | 101631081 A | 1/2010 |
| CN | 102111327 A | 6/2011 |

(Continued)

OTHER PUBLICATIONS

International Search Report in international application No. PCT/CN2012/074866, mailed on Aug. 2, 2012.
(Continued)

*Primary Examiner* — Jenee Williams
(74) *Attorney, Agent, or Firm* — Oppedahl Patent Law Firm LLC (57) ABSTRACT

A cell processing method and device for a Switch Fabric (SF) chip are disclosed, which belong to the field of communications. The SF chip includes a unicast route table, which is multiplexed in two working modes and is looked up according to a unicast cell, and a multicast route table, which is multiplexed in the two working modes and is looked up according to a multicast cell. The cell processing method for an SF chip includes: the SF chip receives a cell and an input link number corresponding to the cell from an upstream apparatus and extracts a destination Identifier (ID) of the cell; the SF chip looks up a route table according to a working mode of the SF chip, the destination ID and the input link number to determine a first bitmap corresponding to the cell; and the SF chip performs load balancing on the first bitmap to obtain a second bitmap and outputs the cell to a downstream apparatus according to the second bitmap. With the technical solutions of the disclosure, the SF chip in a cascade switching system can adapt to different working modes.

10 Claims, 5 Drawing Sheets (51) Int. Cl.
  *H04L 12/741* (2013.01)
  *H04L 12/933* (2013.01)
  *H04L 12/803* (2013.01)
  *H04L 12/927* (2013.01)

(52) U.S. Cl.
  CPC ............ *H04L47/806* (2013.01); *H04L 49/105* (2013.01); *H04L 49/201* (2013.01); *H04L 49/3009* (2013.01); *H04L 49/505* (2013.01)

(56) References Cited

U.S. PATENT DOCUMENTS

| | | | | |
|---|---|---|---|---|
| 2002/0118640 A1* | 8/2002 | Oberman | ................ | H04L 49/25 370/230 |
| 2002/0118692 A1* | 8/2002 | Oberman | ............ | H04L 12/5601 370/419 |
| 2002/0122386 A1* | 9/2002 | Calvignac | ........... | H04L 12/5601 370/230 |
| 2002/0154634 A1* | 10/2002 | Basso | ................ | H04L 12/1881 370/390 |
| 2002/0167950 A1* | 11/2002 | Chang | ..................... | H04L 12/66 370/396 |
| 2002/0181440 A1* | 12/2002 | Norman | .................. | H04L 49/15 370/351 |
| 2002/0181452 A1* | 12/2002 | Norman | .................. | H04L 49/15 370/380 |
| 2002/0181454 A1* | 12/2002 | Norman | .................. | H04L 49/15 370/386 |
| 2003/0002506 A1* | 1/2003 | Moriwaki et al. | ............ | 370/392 |
| 2003/0021276 A1* | 1/2003 | Lee | ....................... | H04L 49/201 370/395.1 |
| 2003/0026205 A1* | 2/2003 | Mullendore | ........ | H04L 12/5693 370/230 |
| 2004/0085894 A1* | 5/2004 | Wang | .................. | H04L 41/0663 370/216 |
| 2004/0090995 A1* | 5/2004 | Kang | ..................... | H04L 49/352 370/535 |
| 2005/0188003 A1* | 8/2005 | Teramura | ................ | G06F 1/266 709/200 |
| 2005/0192031 A1* | 9/2005 | Vare | ........................ | 455/456.6 |
| 2005/0233705 A1* | 10/2005 | Vare et al. | ........................ | 455/70 |
| 2006/0176899 A1* | 8/2006 | Lavigne | .................. | H04L 49/65 370/465 |
| 2006/0187913 A1* | 8/2006 | LaVigne | ................ | H04L 12/56 370/389 |
| 2009/0129393 A1* | 5/2009 | Okuno et al. | .............. | 370/395.6 |
| 2011/0038371 A1 | 2/2011 | Lin | | |
| 2011/0116517 A1 | 5/2011 | Li | | |

FOREIGN PATENT DOCUMENTS

| | | |
|---|---|---|
| CN | 102281192 A | 12/2011 |
| EP | 1168710 A2 | 1/2002 |
| WO | 2005043842 A1 | 5/2005 |

OTHER PUBLICATIONS

English Translation of the Written Opinion of the International Search Authority in international application No. PCT/CN2012/074866, mailed on Aug. 2, 2012.

\* cited by examiner

|   | 95 |   |   |   | 0 |
|---|----|---|---|---|---|
| 0 | 1  | 0 | ...... | 0 | 1 |
|   |    |   |   |   |   |
| ⋮ |    |   |   |   |   |
|   |    |   |   |   |   |
| 8191 |  |   |   |   |   |

Fig. 6

|   | 95 |   |   |   | 0 |
|---|---|---|---|---|---|
| 0 | 1 | 0 | ...... | 0 | 1 |
|   |   |   |   |   |   |
| ⋮ |   |   |   |   |   |
|   |   |   |   |   |   |
| 512 |   |   |   |   |   |

CELL PROCESSING METHOD AND DEVICE FOR SWITCH FABRIC CHIP

TECHNICAL FIELD

The disclosure relates to the field of communications, and in particular to a cell processing method and device for a Switch Fabric (SF) chip.

BACKGROUND

Figure 1:
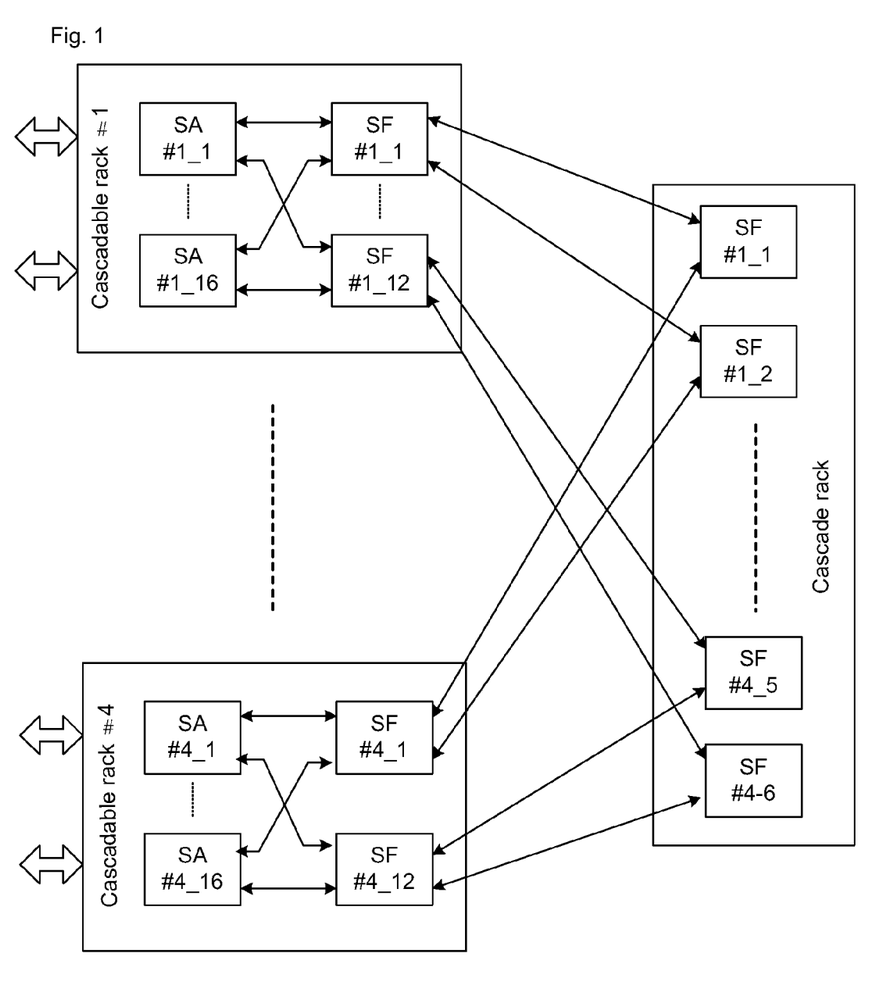
FIG. 1 is a diagram showing the working mode of an SF chip in the related art.

In existing core switching networks, multistage interconnected cluster technology is mostly adopted to implement a high-performance router for a network with switching capacity of over T bits. Such high-performance router is mainly applied in a backbone network to provide excellent Quality of Service (QoS) performance, with the typical structure as shown in FIG. 1. It can be seen that an SF chip is in two working modes in a two-stage interconnected network.

In the first working mode, the SF chip is on a cascadable rack and is connected with a Switch Access (SA) chip and an SF chip of the next stage. The working mode is logically divided into two procedures: firstly, a cell is obtained from the SA chip to be switched to the SF chip of the next stage; and then, the cell is obtained from the SF chip of the next stage to be switched to the SA chip. The two procedures are referred to as SF1 and SF3 respectively and the first working mode is referred to as SF13 mode.

In the second working mode, the SF chip is on a cascaded rack and a cell is obtained in the SF1 and is then switched in the SF3. The second mode is referred to as SF2 mode.

In the two working modes, the SF chip processes the cell differently. In order to enable the SF chip to adapt to different working modes, it is necessary to set a processing circuit for each working mode of the SF chip independently. However, this may affect the scale and power consumption of the chip as well as reliability of the chip.

SUMMARY

A technical problem to be solved by the disclosure is to provide a cell processing method and device for an SF chip, so as to enable the SF chip in a cascade switching system to adapt to different working modes.

In order to solve the technical problem, the technical solutions provided by embodiments of the disclosure are as follows.

In one aspect, a cell processing method for an SF chip is provided. The SF chip includes: a unicast route table, which is multiplexed in two working modes and is looked up according to a unicast cell, and a multicast route table, which is multiplexed in the two working modes and is looked up according to a multicast cell. The two working modes are an SF13 mode and an SF2 mode. The cell processing method for an SF chip includes:

the SF chip receives a cell and an input link number corresponding to the cell from an upstream apparatus and extracts the destination Identifier (ID) of the cell;

the SF chip looks up a route table according to a working mode of the SF chip, the destination ID and the input link number, to determine a first bitmap corresponding to the cell; and the SF chip performs load balancing on the first bitmap to obtain a second bitmap, and outputs the cell to a downstream apparatus according to the second bitmap.

The process that the SF chip looks up a route table according to a working mode of the SF chip, the destination ID and the input link number to determine the first bitmap corresponding to the cell may include: when the cell is a multicast cell, the destination ID of the multicast cell is a multicast ID; and the SF chip looks up an SF1 multicast route table according to the multicast ID of the cell to determine a multicast bitmap with a bit width of 48 bits when the working mode of the SF chip currently is the SF13 mode and the input link number corresponds to an SF1 mode;

the SF chip looks up an SF3 multicast route table according to the multicast ID of the cell to determine a multicast bitmap with a bit width of 48 bits when the working mode of the SF chip currently is the SF13 mode and the input link number corresponds to an SF3 mode; and the SF chip looks up an SF2 multicast route table according to the multicast ID of the cell to determine a multicast bitmap with a bit width of 96 bits when the working mode of the SF chip currently is the SF2 mode.

The process that the SF chip performs load balancing on the first bitmap to obtain the second bitmap and outputs the cell to the downstream apparatus according to the second bitmap may include:

the SF chip replaces ones in the first bitmap by zeros according to a back pressure condition of an output link;

the SF chip selects, in a polling way, an output link from available output links corresponding to each trunk group in the first bitmap in which ones are replaced by zeros, to obtain the second bitmap in which the available output links are equal to trunk groups in number; and the SF chip replicates the multicast cell, and outputs a plurality of replicated multicast cells to the downstream apparatus according to the second bitmap.

The process that the SF chip looks up a route table according to a working mode of the SF chip, the destination ID and the input link number to determine the first bitmap corresponding to the cell may include: when the cell is a unicast cell, the destination ID of the unicast cell is a unicast ID; and the SF chip looks up an SF1 unicast route table according to the unicast ID of the cell to determine a unicast bitmap with a bit width of 48 bits when the working mode of the SF chip currently is the SF13 mode and the input link number corresponds to an SF1 mode;

the SF chip looks up an SF3 unicast route table according to the unicast ID of the cell to determine a unicast bitmap with a bit width of 48 bits when the working mode of the SF chip currently is the SF13 mode and the input link number corresponds to an SF3 mode; and the SF chip looks up an SF2 unicast route table according to the unicast ID of the cell to determine a unicast bitmap with a bit width of 96 bits when the working mode of the SF chip currently is the SF2 mode.

The process that the SF chip performs load balancing on the first bitmap to obtain the second bitmap and outputs the cell to the downstream apparatus according to the second bitmap may include:

the SF chip replaces ones in the first bitmap by zeros according to a back pressure condition of the output link; and the SF chip selects, in a polling way, an output link from all available output links in the first bitmap in which ones are replaced by zeros, and outputs the unicast cell to the downstream apparatus through the output link.

An embodiment of the disclosure further provides a cell processing device for an SF chip. The SF chip includes: a unicast route table, which is multiplexed in two working modes and is looked up according to a unicast cell, and a multicast route table, which is multiplexed in the two working modes and is looked up according to a multicast cell. The two working modes are an SF13 mode and an SF2 mode. The cell processing device for an SF chip includes:

a receiving module configured to receive a cell and an input link number corresponding to the cell from an upstream apparatus and extract a destination ID of the cell;

a first processing module configured to look up a route table according to a working mode of the SF chip, the destination ID and the input link number to determine a first bitmap corresponding to the cell;

a second processing module configured to perform load balancing on the first bitmap to obtain a second bitmap; and a sending module configured to output the cell to a downstream apparatus according to the second bitmap.

When the cell is a multicast cell, the destination ID of the multicast cell is a multicast ID; and the first processing module may be configured to:

look up an SF1 multicast route table according to the multicast ID of the cell to determine a multicast bitmap with a bit width of 48 bits when the working mode of the SF chip currently is the SF13 mode and the input link number corresponds to an SF1 mode;

look up an SF3 multicast route table according to the multicast ID of the cell to determine a multicast bitmap with a bit width of 48 bits when the working mode of the SF chip currently is the SF13 mode and the input link number corresponds to an SF3 mode; and look up an SF2 multicast route table according to the multicast ID of the cell to determine a multicast bitmap with a bit width of 96 bits when the working mode of the SF chip currently is the SF2 mode.

The second processing module may be configured to replace ones in the first bitmap by zeros according to a back pressure condition of an output link and select, in a polling way, an output link from available output links corresponding to each trunk group in the first bitmap in which ones are replaced by zeros, to obtain the second bitmap in which the available output links are equal to trunk groups in number; and the sending module may be configured to replicate the multicast cell and output a plurality of replicated multicast cells to the downstream apparatus according to the second bitmap.

When the cell is a unicast cell, the destination ID of the unicast cell is a unicast ID; and the first processing module may be configured to:

look up an SF1 unicast route table according to the unicast ID of the cell to determine a unicast bitmap with a bit width of 48 bits when the working mode of the SF chip currently is the SF13 mode and the input link number corresponds to an SF1 mode;

look up an SF3 unicast route table according to the unicast ID of the cell to determine a unicast bitmap with a bit width of 48 bits when the working mode of the SF chip currently is the SF13 mode and the input link number corresponds to an SF3 mode; and look up an SF2 unicast route table according to the unicast ID of the cell to determine a unicast bitmap with a bit width of 96 bits when the working mode of the SF chip currently is the SF2 mode.

The second processing module may be configured to replace ones in the first bitmap by zeros according to a back pressure condition of the output link and select, in a polling way, an output link from all available output links in the first bitmap in which ones are replaced by zeros; and the sending module may be configured to output the unicast cell to the downstream apparatus through the output link.

The embodiments of the disclosure have the advantages as follows:

In the above solutions, the SF chip includes the unicast route table for unicast cell table look-up by multiplexing in the two working modes and the multicast route table for multicast cell table look-up by multiplexing in the two working modes. The two working modes are the SF13 mode and the SF2 mode. After the cell is received by the SF chip, the SF chip can look up the route table according to the working mode of the SF chip, and the destination ID and the input link number of the cell, to determine the bitmap corresponding to the cell, so as to output the cell to the downstream apparatus. By means of the disclosure, the SF chip can adapt to different working modes.

DETAILED DESCRIPTION

In order to make the technical problem to be solved, technical solutions and beneficial effects of the disclosure clearer and easier to understand, the disclosure is elaborated below with reference to the drawings and embodiments.

Embodiments of the disclosure provide a cell processing method and device for an SF chip, to enable the SF chip in a cascade switching system to adapt to different working modes.

Figure 2:
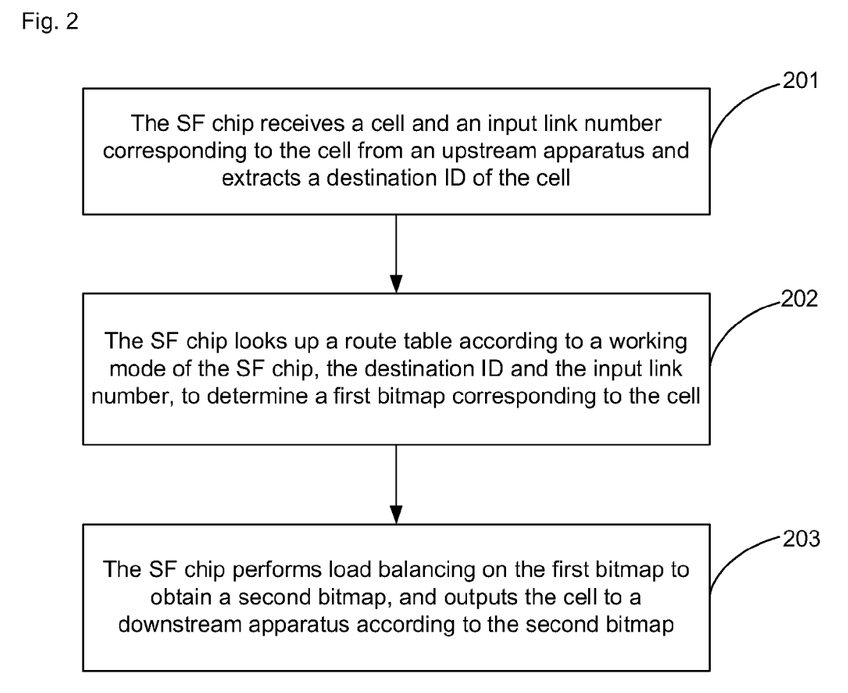
FIG. 2 is a diagram showing the flow of a cell processing method for an SF chip in an embodiment of the disclosure.

FIG. 2 is a diagram showing the flow of a cell processing method for an SF chip in an embodiment of the disclosure. As shown in FIG. 2, the embodiment includes:

Step 201: The SF chip receives a cell and an input link number corresponding to the cell from an upstream apparatus and extracts a destination ID of the cell.

Step 202: The SF chip looks up a route table according to a working mode of the SF chip, the destination ID and the input link number, to determine a first bitmap corresponding to the cell.

Step 203: The SF chip performs load balancing on the first bitmap to obtain a second bitmap and outputs the cell to a downstream apparatus according to the second bitmap.

The SF chip includes the unicast route table for unicast cell table look-up by multiplexing in the two working modes and the multicast route table for multicast cell table look-up by multiplexing in the two working modes. The two working modes are the SF13 mode and the SF2 mode. After the cell is received by the SF chip, the SF chip can look up a route table according to the working mode of the SF chip, and the destination ID and the input link number of the cell, to determine the bitmap corresponding to the cell, so as to output the cell to the downstream apparatus. By means of the disclosure, the SF chip can adapt to different working modes.

Figure 3:
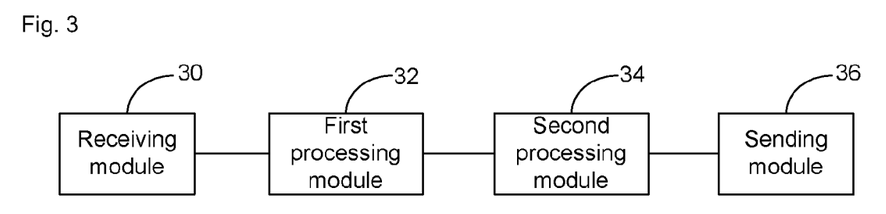
FIG. 3 is a diagram showing the structure of a cell processing device for an SF chip in an embodiment of the disclosure.

FIG. 3 is a diagram showing the structure of a cell processing device for an SF chip in an embodiment of the disclosure. As shown in FIG. 3, the embodiment includes:

a receiving module 30 configured to receive a cell and an input link number corresponding to the cell from an upstream apparatus and extract a destination ID of the cell;

a first processing module 32 configured to look up a route table according to a working mode of the SF chip, the destination ID and the input link number, to determine a first bitmap corresponding to the cell;

a second processing module 34 configured to perform load balancing on the first bitmap to obtain a second bitmap; and a sending module 36 configured to output the cell to a downstream apparatus according to the second bitmap.

When the cell is a multicast cell, the destination ID of the multicast cell is a multicast ID; and the first processing module 32 is specifically configured to: look up an SF1 multicast route table according to the multicast ID of the cell to determine a multicast bitmap with a bit width of 48 bits when the working mode of the SF chip currently is the SF13 mode and the input link number corresponds to an SF1 mode; look up an SF3 multicast route table according to the multicast ID of the cell to determine a multicast bitmap with a bit width of 48 bits when the working mode of the SF chip currently is the SF13 mode and the input link number corresponds to an SF3 mode; and look up an SF2 multicast route table according to the multicast ID of the cell to determine a multicast bitmap with a bit width of 96 bits when the working mode of the SF chip currently is the SF2 mode.

Preferably, the second processing module 34 is specifically configured to replace ones in the first bitmap by zeros according to a back pressure condition of an output link and select, in a polling way, an output link from the available output links corresponding to each trunk group in the first bitmap in which ones are replaced by zeros, to obtain the second bitmap in which the available output links are equal to trunk groups in number; and the sending module 36 is specifically configured to replicate the multicast cell and output a plurality of replicated multicast cells to the downstream apparatus according to the second bitmap.

When the cell is a unicast cell, the destination ID of the unicast cell is a unicast ID; and the first processing module 32 is specifically configured to: look up an SF1 unicast route table according to the unicast ID of the cell to determine a unicast bitmap with a bit width of 48 bits when the working mode of the SF chip currently is the SF13 mode and the input link number corresponds to an SF1 mode; look up an SF3 unicast route table according to the unicast ID of the cell to determine a unicast bitmap with a bit width of 48 bits when the working mode of the SF chip currently is the SF13 mode and the input link number corresponds to an SF3 mode; and look up an SF2 unicast route table according to the unicast ID of the cell to determine a unicast bitmap with a bit width of 96 bits when the working mode of the SF chip currently is the SF2 mode.

Preferably, the second processing module 34 is specifically configured to replace ones in the first bitmap by zeros according to a back pressure condition of the output link and select, in a polling way, an output link from all available output links in the first bitmap in which ones are replaced by zeros; and the sending module 36 is specifically configured to output the unicast cell to the downstream apparatus through the output link.

The SF chip includes the unicast route table for unicast cell table look-up by multiplexing in the two working modes and the multicast route table for multicast cell table look-up by multiplexing in the two working modes. The two working modes are the SF13 mode and the SF2 mode. After the cell is received by the SF chip, the SF chip can look up a route table according to the working mode of the SF chip, and the destination ID and the input link number of the cell, to determine the bitmap corresponding to the cell, so as to output the cell to the downstream apparatus. By means of the disclosure, the SF chip can adapt to different working modes.

Figure 4:
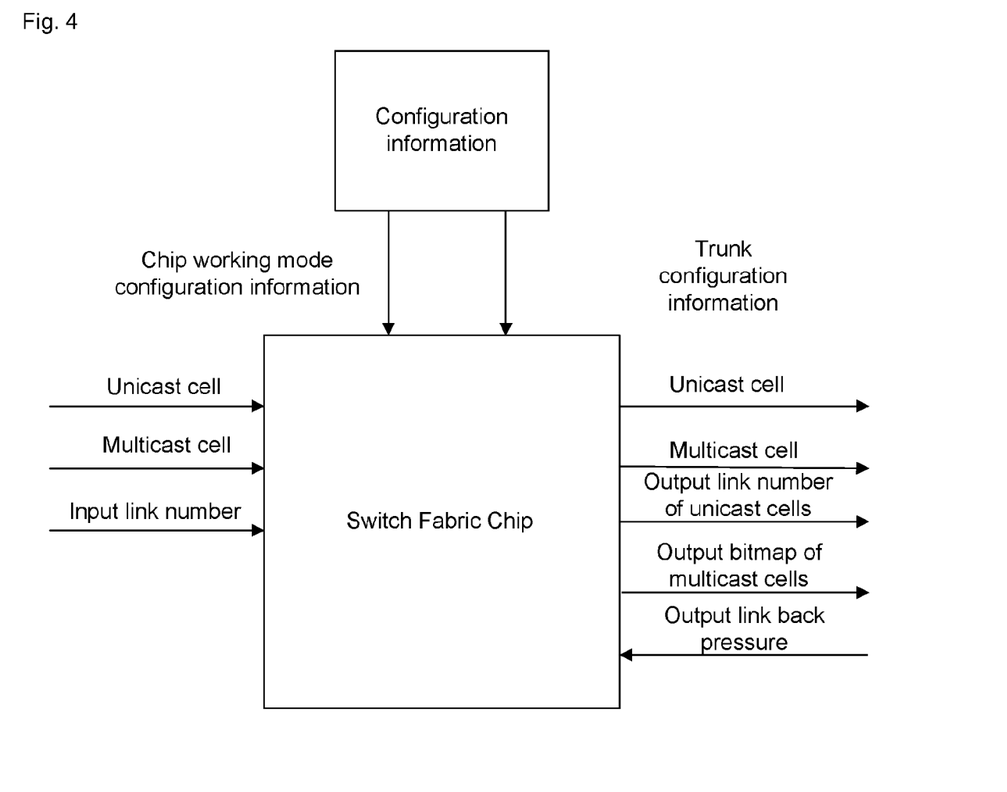
FIG. 4 is a diagram showing the data flow of an SF chip in an embodiment of the disclosure.

The cell processing method for an SF chip of the disclosure is further described below in conjunction with the drawings. As shown in FIG. 4, the SF chip receives input multicast and unicast cells and an input link number, and sends the unicast cell and the multicast cell out respectively according to the output link number of the unicast cell and according to the output bitmap of the multicast cell in conjunction with working mode configuration information and trunk configuration information of the SF chip. The cell processing method for an SF chip of the disclosure includes:

Step 1: The SF chip receives a cell from an upstream apparatus and an input link number of the cell.

Step 2: The SF chip determines the type of the cell and extracts a destination ID of the cell.

There are two types of cells: multicast cells and unicast cells. If the cell is the multicast cell, the SF chip extracts the multicast ID of the head of the multicast cell. If the cell is the unicast cell, the SF chip extracts the destination ID of the head of the unicast cell.

Step 3: The SF chip determines a working mode of the SF chip, and looks up a route table according to the working mode and the input link number.

The SF chip can determine the working mode of the SF chip according to the chip working mode configuration information of the SF chip.

Figure 5:
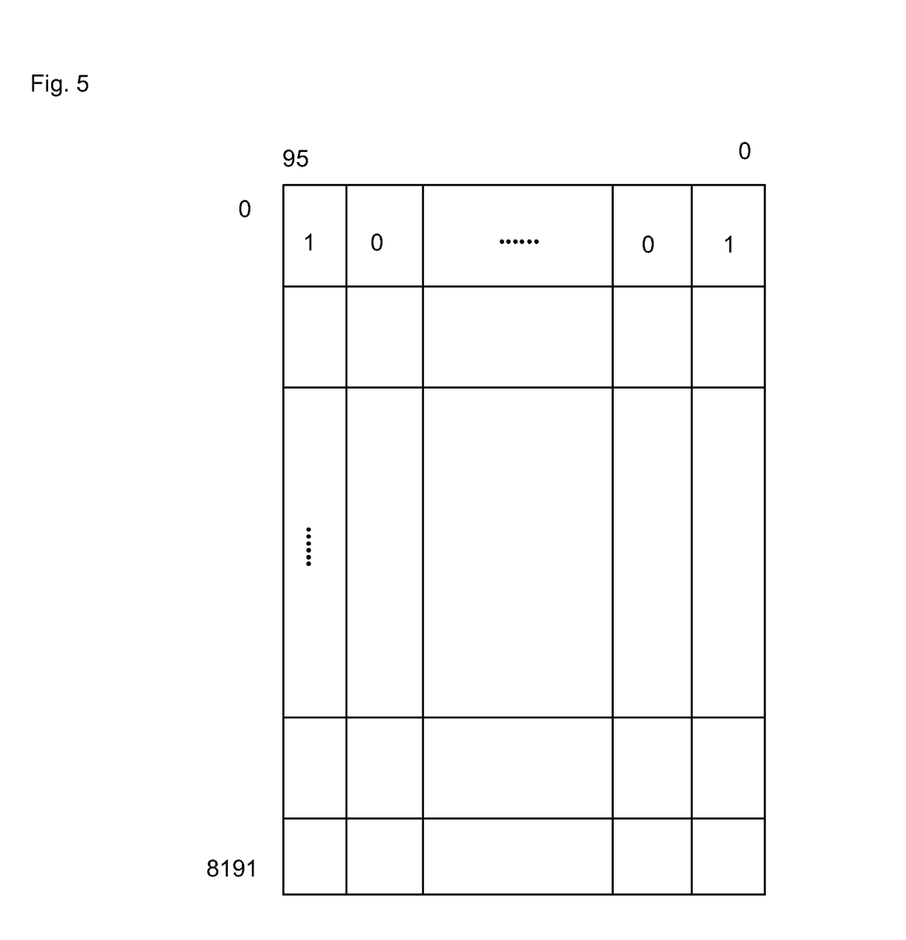
FIG. 5 is a diagram showing the structure of a multicast route table in an embodiment of the disclosure.

As shown in FIG. 5, the multicast route table is a table of 96×8192, and is physically implemented by combining two Random Access Memories (RAMs) with a bit width of 48 bits and a depth of 8 k. In the SF13 mode, the SF chip is logically divided into two parts, which occupy 48 links respectively. Therefore, in the SF13 mode, one of the two RAMs in the multicast route table is occupied in the SF1 mode and the SF3 mode respectively. The left half part occupied in the SF1 mode is referred to as an SF1 multicast route table, and the right half part occupied in the SF3 mode is referred to as an SF3 multicast route table. In the SF2 mode, two RAMs are combined to form a route table, which is referred to as an SF2 multicast route table. In the multicast route table, an address item corresponds to a multicast ID, and a data item corresponds to an alternative output link. Specifically, the number 1 in the Table indicates that the corresponding output link is available. There are 8 k multicast IDs and 96 output links at most. The SF chip can look up the multicast route table according to a found multicast ID.

If the SF chip is in the SF13 mode, the SF1 multicast route table is looked up according to a multicast ID when multicast cells are input from the 0-th link to the 47-th link, and the SF3 multicast route table is looked up when multicast cells are input from the 48-th link to the 95-th link. After the SF1 route table and the SF3 route table are looked up, the bit width of all multicast bitmaps output by the SF chip is 48 bits. If the SF chip is in the SF2 mode, no input link number is distinguished, and the SF chip looks up the SF2 multicast table only according to the multicast ID and outputs a multicast bitmap of 96 bits.

Figure 6:
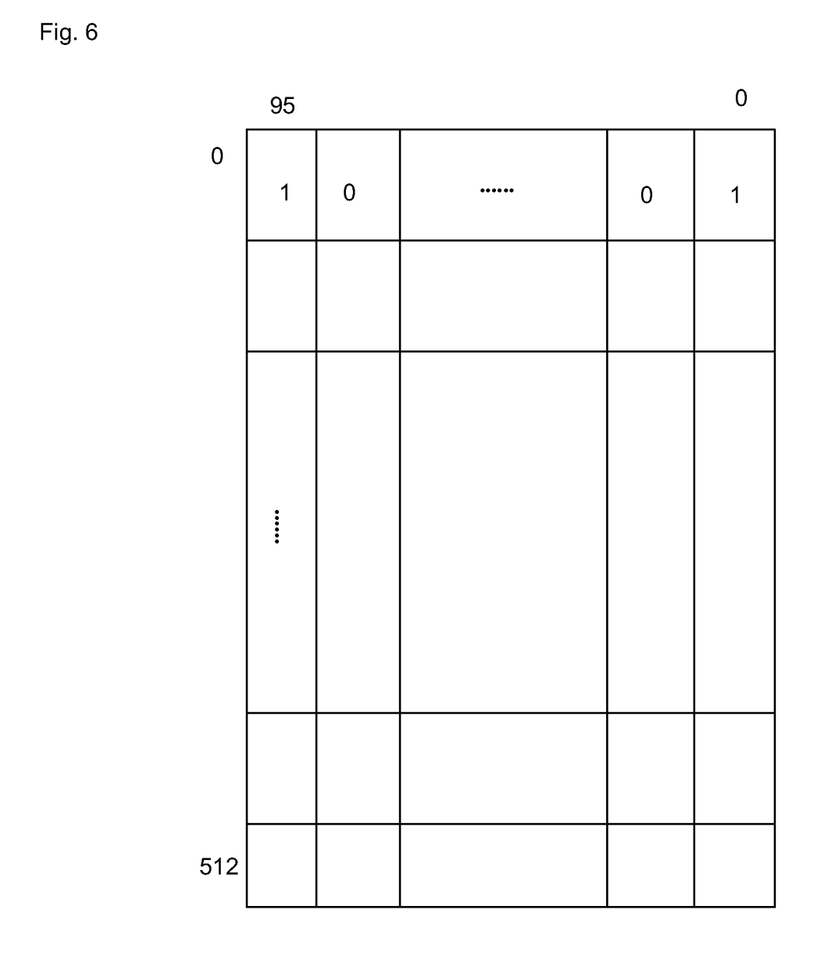
FIG. 6 is a diagram showing the structure of a unicast route table in an embodiment of the disclosure.

As shown in FIG. 6, the unicast route table is a table of 96×512, and is physically implemented by combining two RAMs with a bit width of 48 bits and a depth of 512. In the unicast route table, an address item corresponds to a unicast ID, and a data item corresponds to an alternative output link. Specifically, the number 1 in the Table indicates that the corresponding output link is available. There are 512 unicast IDs and 96 output links at most. The SF chip can look up the unicast route table according to a found unicast ID.

If the SF chip is in the SF13 mode, the SF1 unicast route table is looked up according to a unicast ID when unicast cells are input from the 0-th link to the 47-th link, and the SF3 unicast route table is looked up when unicast cells are input from the 48-th link to the 95-th link. After the SF1 route table and the SF3 route table are looked up, the bit width of all unicast bitmaps output by the SF chip is 48 bits. If the SF chip is in the SF2 mode, no input link number is distinguished, and the SF chip looks up the SF2 unicast table only according to the unicast ID without distinguishing the input link number and outputs a unicast bitmap of 96 bits.

Step 4: The SF chip masks the flow control link in the bitmap according to the back pressure condition of the output link, namely, replacing ones in the bitmap having a link back pressure by zeros, and outputs the processed bitmap.

Step 5: Load balancing is performed on the bitmap processed in Step 4 to output the cell.

For the multicast cell, the SF chip balances a load in the trunk groups and selects one available output link from all available output links corresponding to each destination address item of the multicast cell in the multicast bitmap in a rr polling way in each group; and the multicast bitmap subjected to the load balancing has the same number of 1 as that of the trunk groups. Then, the SF chip replicates and outputs the multicast cell according to the processed multicast bitmap.

For the unicast cell, the SF chip selects an output link from all available links corresponding to the destination address item of the unicast cell in the unicast bitmap in the rr polling way, and outputs the unicast cell through the output link.

If no alternative link is found in the load balancing process of Step 5, the output process of the cell is stopped.

Many functional components described herein are referred to as modules, in order to emphasize their unique implementation ways more particularly.

In the embodiments of the disclosure, the modules can be implemented by software, in order to be executed by various processors. For example, an identity executable code module can include one or more physical or logic blocks of computer instructions. For example, it can be constructed as an object, a process or a function. Even so, the executable codes of the identity module do not need to be located together physically, but can include different instructions stored at different locations. These instructions are combined together logically to construct a module and achieve the objective specified by the module.

Actually, the executable code module can be one or more instructions, and can be even distributed on many different code segments, in different programs and over many storage devices. Likewise, operational data can be identified in the module, be implemented in any appropriate form and be organized in any data structure of appropriate type. The operational data can be collected as a single data set or be distributed at different locations (for example, on different storage devices), and can be at least partially stored on a system or a network only as an electronic signal.

When the modules can be implemented by software, in consideration of the level of the existing hardware process, those skilled in the art can set up a corresponding hardware circuit to implement the corresponding function for the modules which can be implemented by software without considering the cost. The hardware circuit includes a conventional Very-Large-Scale Integration (VLSI) circuit or a gate array, and a conventional semiconductor, such as a logic chip and a transistor, or other discrete components. The modules can be further implemented by a programmable hardware device, such as a field programmable gate array, a programmable array logic and a programmable logic device.

In the embodiment of each method of the disclosure, the serial numbers of various steps are not intended to define a temporal order in which these steps are executed. Any change in the order of executing various steps made by those skilled in the art without paying any creative labour shall fall within the scope of protection of the claims of the disclosure.

The above are only the preferable embodiments of the disclosure. It should be indicated that some modifications and improvements can be made by those skilled in the art without departing from the principle of the disclosure and shall fall within the scope of protection of the claims of the disclosure.

The invention claimed is:

1. A cell processing method for a Switch Fabric SF chip, comprising:
   providing, in the SF chip, a unicast route table, which is multiplexed in two working modes of an SF13 mode and an SF2 mode and is looked up according to a unicast cell;
   providing, in the SF chip, a multicast route table, which is multiplexed in the two working modes of the SF13 mode and the SF2 mode and is looked up according to a multicast cell;
   receiving, by the SF chip, a cell and an input link number corresponding to the cell from an upstream apparatus, and extracting a destination Identifier ID of the cell;
   looking up, by the SF chip, a route table according to a working mode of the SF chip, the destination ID and the input link number, and determining a first bitmap corresponding to the cell; and
   performing, by the SF chip, load balancing on the first bitmap to obtain a second bitmap, and outputting the cell to a downstream apparatus according to the second bitmap.

2. The method according to claim 1, wherein when the cell is a multicast cell, the destination ID of the multicast cell is a multicast ID, and the step of looking up, by the SF chip, a route table according to a working mode of the SF chip, the destination ID and the input link number, and determining a first bitmap corresponding to the cell comprises:
   looking up, by the SF chip, an SF1 multicast route table according to the multicast ID of the cell to determine a multicast bitmap with a bit width of 48 bits when the working mode of the SF chip currently is the SF13 mode and the input link number corresponds to an SF1 mode;
   looking up, by the SF chip, an SF3 multicast route table according to the multicast ID of the cell to determine a multicast bitmap with a bit width of 48 bits when the working mode of the SF chip currently is the SF13 mode and the input link number corresponds to an SF3 mode; and
   looking up, by the SF chip, an SF2 multicast route table according to the multicast ID of the cell to determine a multicast bitmap with a bit width of 96 bits when the working mode of the SF chip currently is the SF2 mode.

3. The method according to claim 2, wherein the step of performing, by the SF chip, load balancing on the first bitmap to obtain the second bitmap and outputting the cell to the downstream apparatus according to the second bitmap comprise:
   replacing, by the SF chip, ones in the first bitmap by zeros according to a back pressure condition of an output link;
   selecting, by the SF chip in a polling way, an output link from available output links corresponding to each trunk group in the first bitmap in which ones are replaced by zeros, to obtain the second bitmap in which the available output links are equal to trunk groups in number; and replicating, by the SF chip, the multicast cell, and outputting a plurality of replicated multicast cells to the downstream apparatus according to the second bitmap.

4. The method according to claim 1, wherein when the cell is a unicast cell, the destination ID of the unicast cell is a unicast ID, and the step of looking up, by the SF chip, a route table according to a working mode of the SF chip, the destination ID and the input link number, and determining the first bitmap corresponding to the cell comprises:

looking up, by the SF chip, an SF1 unicast route table according to the unicast ID of the cell to determine a unicast bitmap with a bit width of 48 bits when the working mode of the SF chip currently is the SF13 mode and the input link number corresponds to an SF1 mode;

looking up, by the SF chip, an SF3 unicast route table according to the unicast ID of the cell to determine a unicast bitmap with a bit width of 48 bits when the working mode of the SF chip currently is the SF13 mode and the input link number corresponds to an SF3 mode; and looking up, by the SF chip, an SF2 unicast route table according to the unicast ID of the cell to determine a unicast bitmap with a bit width of 96 bits when the working mode of the SF chip currently is the SF2 mode.

5. The method according to claim 4, wherein the step of performing, by the SF chip, load balancing on the first bitmap to obtain the second bitmap and outputting the cell to the downstream apparatus according to the second bitmap comprise:

replacing, by the SF chip, ones in the first bitmap by zeros according to a back pressure condition of the output link; and selecting, by the SF chip in a polling way, an output link from all available output links in the first bitmap in which ones are replaced by zeros, and outputting the unicast cell to the downstream apparatus through the output link.

6. A cell processing device for a Switch Fabric SF chip, wherein the SF chip comprises: a unicast route table, which is multiplexed in two working modes and is looked up according to a unicast cell, and a multicast route table, which is multiplexed in the two working modes and is looked up according to a multicast cell, the two working modes are an SF13 mode and an SF2 mode, and the cell processing device for an SF chip comprises:

a memory configured to store instructions, when executed by a processor, the instructions being configured to receive a cell and an input link number corresponding to the cell from an upstream apparatus and extract a destination Identifier ID of the cell;

look up a route table according to a working mode of the SF chip, the destination ID and the input link number, and determine a first bitmap corresponding to the cell;

perform load balancing on the first bitmap to obtain a second bitmap; and output the cell to a downstream apparatus according to the second bitmap.

7. The device according to claim 6, wherein when the cell is a multicast cell, the destination ID of the multicast cell is a multicast ID; and the instructions are further configured to:

look up an SF1 multicast route table according to the multicast ID of the cell, and determine a multicast bitmap with a bit width of 48 bits when the working mode of the SF chip currently is the SF13 mode and the input link number corresponds to an SF1 mode;

look up an SF3 multicast route table according to the multicast ID of the cell to determine a multicast bitmap with a bit width of 48 bits when the working mode of the SF chip currently is the SF13 mode and the input link number corresponds to an SF3 mode; and look up an SF2 multicast route table according to the multicast ID of the cell to determine a multicast bitmap with a bit width of 96 bits when the working mode of the SF chip currently is the SF2 mode.

8. The device according to claim 7, wherein the instructions are further configured to replace ones in the first bitmap by zeros according to a back pressure condition of an output link and select, in a polling way, an output link from available output links corresponding to each trunk group in the first bitmap in which ones are replaced by zeros, to obtain the second bitmap in which the available output links are equal to trunk groups in number; and the instructions are further configured to replicate the multicast cell and output a plurality of replicated multicast cells to the downstream apparatus according to the second bitmap.

9. The device according to claim 6, wherein when the cell is a unicast cell, the destination ID of the unicast cell is a unicast ID; and the instructions are further configured to:

look up an SF1 unicast route table according to the unicast ID of the cell to determine a unicast bitmap with a bit width of 48 bits when the working mode of the SF chip currently is the SF13 mode and the input link number corresponds to an SF1 mode;

look up an SF3 unicast route table according to the unicast ID of the cell to determine a unicast bitmap with a bit width of 48 bits when the working mode of the SF chip currently is the SF13 mode and the input link number corresponds to an SF3 mode; and look up an SF2 unicast route table according to the unicast ID of the cell to determine a unicast bitmap with a bit width of 96 bits when the working mode of the SF chip currently is the SF2 mode.

10. The device according to claim 9, wherein the instructions are further configured to replace ones in the first bitmap by zeros according to a back pressure condition of the output link and select, in a polling way, an output link from all available output links in the first bitmap in which ones are replaced by zeros; and the instructions are further configured to output the unicast cell to the downstream apparatus through the output link.

* * * * *